United States Patent [19]

Tsumiyama et al.

[11] Patent Number: 4,879,341
[45] Date of Patent: Nov. 7, 1989

[54] POLYESTER/POLYAMIDE RESIN COMPOSITIONS CONTAINING GRAFTED POLYOLEFIN AND MOLDED PRODUCTS THEREOF

[75] Inventors: Tatsuo Tsumiyama; Toshiro Shimada; Yoshifumi Akagawa; Satoru Nakamoto; Teruo Takada, all of Ube, Japan

[73] Assignee: Ube Industries, Ltd., Ube, Japan

[21] Appl. No.: 199,337

[22] Filed: May 26, 1988

[30] Foreign Application Priority Data

Jun. 3, 1987 [JP] Japan .................... 62-138180
Aug. 27, 1987 [JP] Japan .................... 62-211389
Feb. 12, 1988 [JP] Japan .................... 63-28746

[51] Int. Cl.$^4$ ............................................ C08L 77/00
[52] U.S. Cl. .................................... 525/66; 525/425; 525/426
[58] Field of Search ........................................ 525/66

[56] References Cited

U.S. PATENT DOCUMENTS

| 4,013,613 | 3/1977 | Abolins et al. | 260/873 |
| 4,229,340 | 10/1980 | Druin et al. | 525/425 |
| 4,415,699 | 11/1983 | Nield et al. | 524/538 |
| 4,574,154 | 3/1986 | Okamoto et al. | 544/192 |
| 4,663,372 | 5/1987 | Okamoto et al. | 524/100 |

FOREIGN PATENT DOCUMENTS

| 0021303 | 1/1981 | European Pat. Off. | 525/66 |
| 47-19101 | 6/1972 | Japan . | |
| 47-24465 | 7/1972 | Japan . | |
| 60-50968 | 3/1985 | Japan . | |
| 1213256 | 9/1986 | Japan | 525/66 |
| 61-53348 | 11/1986 | Japan . | |
| 1450321 | 9/1987 | United Kingdom . | |

OTHER PUBLICATIONS

Kobunshi Ronbunshu, vol. 44, No. 2, pp. 81-88 (Feb., 1987).
Kobunshi Ronbunshu, vol. 44, No. 2, pp. 89-95 (Feb., 1987).
"Crystalline Olefin Polymers" (High Polymer, vol. XX—Part I; Edited by R. A. C. Raff and K. W. Doak (1965); pp. 514-553.

Primary Examiner—Lewis T. Jacobs
Assistant Examiner—A. Carrillo
Attorney, Agent, or Firm—Frishauf, Holtz, Goodman & Woodward

[57] ABSTRACT

A resin composition comprising;
100 parts by weight of a mixture comprising (a) from 5 to 95% by weight of polyamide and (b) from 95 to 5% by weight of a thermoplastic polyester; and
(c) from 0.5 part to 40 parts by weight of a grafted polyolefin modified product formed by graft polymerization of an addition polymer having a peroxy bond in its molecular chain to a modified polyolefin having a functional group in its molecular chain; and a molded product thereof.

16 Claims, No Drawings

POLYESTER/POLYAMIDE RESIN COMPOSITIONS CONTAINING GRAFTED POLYOLEFIN AND MOLDED PRODUCTS THEREOF

BACKGROUND OF THE INVENTION

This invention relates to a resin composition and a molded product thereof which are useful as component materials for various automobile parts, machine parts, electric or electronic parts and component materials for general merchandise.

Thermoplastic polyesters typified by polyethylene terephthalate and polybutylene terephthalate have superior mechanical properties, in particular, a high rigidity and strength, and are widely used as superior engineering plastics. On the other hand, polyamides such as polycaproamide and polyhexamethylene adipamide are utilized as important materials in the field of molding products having different uses from those of polyesters, making the most of their superior toughness, wear resistance and chemical resistance.

It has been hitherto attempted to combine such polyesters and polyamides to utilize the superior properties possessed by each of them, and also to settle the problems possessed by each of them. For example, Japanese Patent Publication Nos. 19101/1972 and 24465/1972, Japanese Unexamined Patent Publication Nos. 56742/1973, 114661/1974, 34754/1981 and 49657/1982, etc. disclose techniques in which the composition for compounding polyester and polyamide is varied respectively depending on purposes or fibrous reinforcing materials and inorganic fillers are used in combination as additives in order to settle the problems arising when the polyester and polyamide are combined.

In instances in which the polyester and polyamide are mixed, usually applied is a melt kneading method, but no homogeneous kneaded products can be obtained because of poor compatibility between polyester and polyamide, bringing about the problems that molded products obtained from such kneaded products have poor mechanical properties and a great scattering of the mechanical properties is seen for each molded product. Among such problems, particularly questioned are a low impact strength or tensile elongation of the molded products and a great scattering of heat distortion temperature, and moreover it may further occur that layer separation is caused in the molded products when they are used. There is also another problem that since the polyester which is a constituent component of the kneaded products causes a lowering of molecular weight because of its hydrolysis, the mechanical properties are lowered when the molded products are immersed in hot water for a long time. Accordingly, owing to such problems, the component materials comprising the combination of polyester and polyamide are applied to various fields with obstruction.

In the instances in which the polyester and polyamide are mixed, usually applied is a melt kneading method, but no homogeneous kneaded products can be obtained because of poor compatibility between polyester and polyamide, as mentioned above. To solve such a problem, studies have been made on methods in which various compatibilizing agents are added. However, the mechanical properties, particularly flexural rigidity, of the products thus formed by kneading polyamide and polyester necessarily depend on the flexural rigidity of the compositions compounded therein.

SUMMARY OF THE INVENTION

An object of this invention is to provide a resin composition, and a molded product thereof, that can eliminate such problems, makes it possible to knead the constituent components containing polyester and polyamide in a homogeneous state, whereby the molded product obtained from the kneaded product can have scattering-free superior mechanical properties, and has superior hydrolytic resistance as being free from any change in mechanical properties even after immersed in hot water for a long time.

A further object of this invention is to provide a resin composition having a greatly improved flexural rigidity without depending on the mechanical properties (particularly in relation to the flexural rigidity) of such compounded compositions.

The present inventors made studies to achieve the above objects. As a result, they found that a molded product obtained by further compounding a specific grafted polyolefin into a mixture comprising polyester and polyamide can have a dense and homogeneous structure and have superior mechanical properties, and thus accomplished this invention.

Namely, this invention is concerned with a resin composition, and a molded product thereof, comprising;

100 parts by weight of a mixture comprising (a) from 5 to 95% by weight of polyamide and (b) from 95 to 5% by weight of a thermoplastic polyester; and (c) from 0.5 part to 40 parts by weight of a grafted polyolefin modified product formed by graft polymerization of an addition polymer having a peroxy bond in its molecular chain to a modified polyolefin having a functional group in its molecular chain.

In a preferred embodiment of this invention, the concentration ratio of terminal amino groups to terminal carboxyl groups in said polyamide is made to be 1.5 or more, whereby the resulting resin composition and the molded product thereof can have not only a dense and homogeneous structure but also superior hydrolytic resistance even in hot water.

In another preferred embodiment, from 0.3 part to 20 parts by weight of ethylenedimelamine as component (d) is further added to the resin composition of this invention, whereby the resulting highly rigid resin composition can be greatly improved in its mechanical properties, particularly in the flexural modulus.

DESCRIPTION OF THE PREFERRED EMBODIMENTS

There is no particular limitation in the component (a) polyamide used in this invention, and it is obtained from an amino acid, a lactam or diamine and a dicarboxylic acid, and there may be available any polyamides if they are polymers capable of being subjected to melt polymerization and melt molding.

Of the monomers used as raw materials for preparing the component (a) polyamide, the amino acid may include, for example, 6-aminocaproic acid, 11-aminoundecanoic acid, 12-aminododecanoic acid, para-aminomethylbenzoic acid, etc; the lactam may include, for example, $\epsilon$-caprolactam, $\omega$-laurolactam, etc.; and the diamine may include, for example, tetramethylenediamine, hexamethylenediamine, undecamethylenediamine, dodecamethylenediamine, 2,2,4-/2,4,4-trimethylhexamethylenediamine, 5-methylnonamethylenediamine, methaxylylenediamine, paraxylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4aminocyclohexyl)propane, bis(aminopropyl)piperazine, aminoethylpiperazine, etc. The dicarboxylic acid may include, for example, adipic acid, suberic acid, azelaic acid, sebacic acid, dodecanoic diacid, terephthalic acid, isophthalic acid, 2-chloroterephthalic acid, 2-methylterephthalic acid, 5-methylisophthalic acid, 5-sodiumsulfoisophthalic acid, hexahydroterephthalic acid, hexahydroisophthalic acid, diglycolic acid, etc.

Preferred polyamides as component (a) of this invention may include, for example, polycaproamide (nylon 6), polyhexamethylene adipamide (nylon 6,6) polyhexamethylene sebacamide (nylon 6,10), polyundecamethylene adipamide (nylon 11,6), polyhexamethylene dodecamide (nylon 6,12), polyundecanamide (nylon 11), polydodecanamide (nylon 12), and a copolymerized polyamide or mixed polyamide of any of these, etc.

The component (a) polyamide may preferably have a relative viscosity ranging from 2.0 to 5.0 at 25° C. in a solution obtained by dissolving it in concentrated sulfuric acid so as to be in concentration of 1%.

Such component (a) can be prepared by adding a monoamine having 6 to 22 carbon atoms or a diamine having 2 to 22 carbon atoms when polyamide-forming monomers are polymerized.

Here, the monoamine having 6 to 22 carbon atoms may include aliphatic monoamines such as hexylamine, heptylamine, octylamine, 2-ethylhexylamine, nonylamine, decylamine, undecylamine, dodecylamine, tridecylamine, tetradecylamine and octadecylamine; alicylcic monoamines such as cyclohexylamine and methylcyclohexylamine; aromatic monoamines such as benzylamine; etc. The diamine having 2 to 22 carbon atoms may include aliphatic diamines such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine and dodecamethylenediamine; cyclic diamines such as cyclohexanediamine and methylcyclohexanediamine; aromatic diamines such as xylylenediamine; etc. There is no particular limitation in the polymerization method, and there can be used any methods of normal-pressure polymerization and reduced-pressure polymerization.

As described above, the component (a) polyamide used in this invention contains in its molecule a

bond as a repeating unit, and in a preferred embodiment it includes those having the concentration ratio of terminal amino groups to terminal carboxyl groups being 1.5 or more, preferably 2.0 or more.

The component (b) thermoplastic polyester is a polymer obtained by the condensation polymerization carried out using as main components a dicarboxylic acid or an ester-forming derivative thereof and a diol or an ester-forming derivative thereof.

The dicarboxylic acid used here may include, for example, terephthalic acid, isophthalic acid, orthophthalic acid, 2,6-naphthalenedicarboxylic acid, 1,5-naphthalenedicarboxylic acid, bisbenzoic acid, bis(p-carboxyphenyl)methane, anthracenedicarboxylic acid, 4,4'-diphenyletherdicarboxylic acid, 4,4'-diphenoxyethanedicarboxylic acid, adipic acid, sebacic acid, azelaic acid, dodecanoic diacid, 1,3-cyclohexanedicarboxylic acid, 1,4-cyclohexanedicarboxylic acid, or ester-forming derivatives of any of these, etc. which are included alone or as a mixture. The diol component may include ethylene glycol, propylene glycol, 1,4-butanediol, neopentyl glycol, 1,5-pentanediol, 1,6-hexanediol, decamethylene glycol, cyclohexanedimethanol, cyclohexanediol, long chain glycol having a molecular weight of 400 to 6,000, i.e., polyethylene glycol, polypropylene glycol, polytetramethylene glycol, and a mixture of any of these.

The component (b) thermoplastic polyester may include, for example, polyethylene terephthalate, polyethylene naphthalate, polypropylene terephthalate, polybutylene terephthalate, polyhexamethylene terephthalate, polycyclohexanedimethylene terephthalate, a poly(ethylene terephthalate/ethylene isophthalate) copolymer, a poly(butylene terephthalate/butylene dodecadioate) copolymer, etc., and particularly useful in this invention are polyethylene terephthalate and polybutylene terephthalate.

The component (b) thermoplastic polyester may preferably have a relative viscosity ranging from 1.15 to 2.5, more preferably from 1.3 to 2.1, at 25° C. in a solution obtained by dissolving it in orthochlorophenol so as to be in concentration of 0.5%.

The component (c) grafted polyolefin modified product used in this invention include those which can be obtained by graft polymerizing an addition polymer having a peroxy bond in its molecular chain to a modified polyolefin having a functional group in its molecular chain, and this component (c) is a component that facilitates compatibilizing the component (a) polyamide and the component (b) thermoplastic polyester.

The modified polyolefin having a functional group in its molecular chain (hereinafter merely referred to as "modified polyolefin"), which is one of the raw material for preparing component (c), is a polymer formed by introducing a monomer having at least one kind of functional group (hereinafter referred to as "functional-group-containing monomer") selected from a carboxylic acid group, a carboxylic acid metal salt group, a carboxylic acid ester group, an acid anhydride group, an epoxy group, an acid amide group and an imide group, represented by Formula (I) to (VI) shown below, into a polyolefin obtained using as main monomer components, ethylene and an α-olefin or diene having 3 to 20 carbon atoms as exemplified by propylene, butene-1, pentene-1, 4-methylpentene-1, isobutylene, 1,4-hexadiene, dicyclopentadiene, 2,5-norbornadiene, 5-ethyl-2,5-norbornadiene, 5-ethylidenenorbornene, 5-(1'-propenyl)-2-norbornene, butadiene, isoprene, etc.

-continued

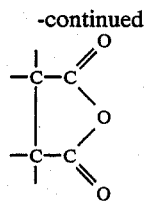
(III)

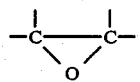
(IV)

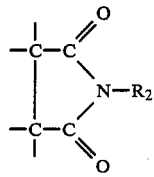
(V)

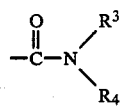
(VI)

(In the above formulas, R₁ to R₄ each represent a hydrogen atom or an aliphatic, alicyclic or aromatic residual group having 1 to 30 carbon atoms; M represents a mono- to trivalent metal, for example, sodium, potassium, magnesium, zinc or aluminum.)

Examples of the functional-group-containing monomer include acrylic acid, methacrylic acid, maleic acid, fumaric acid, itaconic acid, crotonic acid, methylmaleic acid, methylfumaric acid, mesaconic acid, citraconic acid, glutaconic acid, methyl hydrogen maleate, methyl hydrogen itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, sodium methacrylate, potassium methacrylate, magnesium methacrylate, zinc methacrylate, sodium acrylate, magnesium acrylate, zinc acrylate, maleic anhydride, itaconic anhydride, citraconic anhydride, endobicyclo-[2,2,1]-5-heptene-2,3-dicarboxylic acid, endobicyclo-[2,2,1]-5-heptene-2,3-dicarboxylic anhydride, glycidyl acrylate, glycidyl methacrylate, acrylglycidyl ether, vinylglycidyl ether, vinyl acetate and acrylamide, and N-substituted amide compounds, N-substituted imide compounds, etc. obtained by addition of ammonia, methylamine, ethylamine, butylamine, hexylamine, dodecylamine, oleylamine, stearylamine, cyclohexylamine, benzylamine, aniline, naphthylamine, dimethylamine, diethylamine, methylethylamine, dibutylamine, distearylamine, dicyclohexylamine, ethylcyclohexylamine, methylaniline, phenylnaphthylamine, melamine, ethanolamine,, 3-amino-1-propanol, diethanolamine, morpholine, α-amino-1-pyrrolidone, α-amino-ε-caprolactam, α-monomethylamino-ε-caprolactam, α-monoethylamino-ε-caprolactam, α-monobenzylamino-ε- caprolactam, an amino group terminated nylon 6 oligomer, etc. to the herein described α,β-unsaturated carboxylic acid or anhydrides thereof.

As methods of preparing the modified polyolefin by introducing the functional-group-containing monomer into the polyolefin, there can be applied, for example, a method in which monomers such as α-olefins are copolymerized with said functional-group-containing monomer, or a method in which the above monomers are graft polymerized to polyolefins. Here, the functional-group-containing monomer introduced into the polyolefin may be used in the amount such that the constituent units based on said monomer may be contained in the modified polyolefin preferably in an amount of from 0.001 to 70% by weight, more preferably from 0.01 to 60% by weight.

Modified polyolefins preferred as the raw materials for preparing component (c) are listed below, wherein "g" in, for example, "X—g—Y", shall represent "graft copolymer of X with Y". Namely, the preferred modified polyolefins may include, for example, an ethylene/acrylic acid copolymer, an ethylene/methacrylic acid/sodium methacrylate copolymer, an ethylene/methacrylic acid/zinc methacrylate copolymer, an ethylene/methyl methacrylate/methacrylic acid/magnesium methacrylate copolymer, an ethylene/isobutyl acrylate/methacrylic acid/zinc methacrylate copolymer, an ethylene/methyl acrylate copolymer, an ethylene/methyl acrylate/acrylic acid copolymer, an ethylene/ethyl acrylate copolymer, an ethylene/glycidyl methacrylate copolymer, an ethylene/vinyl acetate/glycidyl methacrylate copolymer, a polyethylene-g-maleic anhydride copolymer, a polypropylene-g-maleic anhydride copolymer, a poly(ethylene/propylene)-g-maleic anhydride copolymer, a poly(ethylene/propylene/1,4-hexadiene)-g-maleic anhydride copolymer, a poly(ethylene/propylene/dicyclopentadiene)-g-maleic anhydride copolymer, a poly(ethylene/propylene/5-ethylidenenorbornene)-g-maleic anhydride copolymer, poly(ethylene/propylene)-g-endobicyclo-[2,2,1]-5-heptene-2,3-dicarboxylic anhydride copolymer, copolymer of a poly(ethylene/methacrylic acid/zinc methacrylate)-g-nylon 6 oligomer having an average polymerization degree of 10, a copolymer formed by addition of cyclohexylamine to poly(ethylene/propylene)-g-maleic anhydride, a copolymer formed by addition of α-amino-ε-caprolactam to poly(ethylene/propylene)-g-maleic anhydride, etc.

Such modified polyolefins may have a melt index preferably of from 0.05 to 50 g/10 minutes, more preferably from 0.1 to 30 g/10 minutes. The melt index otherwise outside this range may result in poor kneading workability undesirably, in the instance of the grafting of the modified polyolefins with the addition polymers described below.

The addition polymer having a peroxy bond in its molecular chain (hereinafter merely referred to as "addition polymer"), which is the other raw material for preparing component (c), is an addition polymer having a peroxy bond or bonds in any of a backbone chain and side chains or in both of these of the molecular chain.

Such an addition polymer is a polymer that can be obtained by subjecting non-conjugated and/or conjugated vinyl monomers and allyl compounds and/or acryloyloxy-group- or methacryloyloxy-group-containing compounds having a peroxy bond (hereinafter these are referred to as "compounds having a peroxy bond") to addition polymerization according to conventional methods, and may be any of an addition polymer obtained by addition polymerization of the above vinyl monomers with the compounds having a peroxy bond and an addition polymer obtained by addition polymerization of vinyl monomers of the type same as or different from the above vinyl monomers to the first-mentioned addition polymer.

Here, the conjugated vinyl monomers may include methyl methacrylate, butyl methacrylate, methyl acrylate, butyl acrylate, methyl 3-vinylacrylate, styrene, vinyl anisole, etc., and the non-conjugated vinyl monomers may include vinyl acetate, vinyl chloride, vinyl fluoride, vinyl ketone, vinyl ether, etc. The allyl compounds having a peroxy bond may include allyl t-butylperoxycarbonate as a typical example, but are by no means limited to this if, besides this, they are compounds or derivatives having an ally group and having a peroxy bond. The acryloyloxy-group- or methacryloyloxy-group-containing compounds having a peroxy bond may include acryloyloxy t-butylperoxycarbonate, methacryloyloxy t-butylperoxycarbonate, etc.

Preferred examples of the addition polymer are listed below, wherein "b" in, for example, "X-b-Y", shall represent "block copolymer of X with Y". Namely, the addition polymer may include, for example, a poly(vinyl acetate/allyl t-butylperoxycarbonate-b-styrene) addition polymer, a poly(n-butyl methacrylate/methacryloyloxymethyl t-butylperoxycarbonate-b-styrene) addition polymer, a poly(acetic acid n-butyl/methacryloyloxymethyl t-butylperoxycarbonate-b-styrene) addition polymer, a poly(butyl methacrylate/methacryloyloxymethyl t-butylperoxycarbonate-b-methyl methacrylate) addition polymer, a poly(vinyl acetate/allyl t-butylperoxycarbonate-b-methyl methacrylate) addition polymer.

Such addition polymers may preferably have an average molecular weight of from 1,000 to 200,000, more preferably from 5,000 to 100,000. The average molecular weight otherwise outside this range may result in poor kneading workability undesirably, when the grafting with the modified polyolefin is carried out. The peroxy bonds in the addition polymer may preferably be contained in an amount of from 0.5 to 30% by weight, more preferably from 1 to 25% by weight as constituent units based on the compounds containing a peroxy bond. An overly small content of the peroxy bonds in the addition polymer may result in an extreme lowering of the grafting effect in the grafting with the modified polyolefin, undesirably. Also, an overly large content may cause gelation in the grafting with the modified polyolefin, making it impossible to obtain any preferred grafted polyolefin modified products.

The component (c) grafted polyolefin modified product can be obtained by graft polymerization of the addition polymer to the above modified polyolefin according to conventional methods.

Here, there is no particular limitation in the proportion in using the modified polyolefin and the addition polymer, but the addition polymer may preferably be used in the proportion of from 1 to 50% by weight relative to from 50 to 99% by weight of the modified polylefin, and the addition polymer may more preferably be used in the proportion of from 3 to 45% by weight relative to from 55 to 97% by weight of the modified polyolefin. Using too small amount using the addition polymer may bring about the problems such that compositions capable of giving preferred physical properties can not be obtained when the grafted polyolefin modified product formed is added in the mixture of the polyamide and thermoplastic polyester. Also, using too large an amount makes it impossible to form a dense structure of the thermoplastic polyester or the polyamide particles, so that compositions capable of giving preferred physical properties can not be obtained. Examples of the component (c) grafted polyolefin modified product may include poly(ethylene/acrylic acid)-g-poly(butyl acrylate-b-styrene), poly(ethylene/methacrylic acid/sodium methacrylate)-g-poly(butyl acrylate-b-styrene), poly(ethylene/methacrylic acid/zinc methacrylate)-g-poly(butyl acrylate-b-styrene), poly(ethylene/methyl methacrylate/magnesium methacrylate)-g-poly(butyl acrylate-b-styrene), poly(ethylene/isobutyl acrylate/methacrylic acid/zinc methacrylate)-g-poly(butyl acrylate-b-styrene), poly(ethylene/methyl acrylate)-g-poly(butyl acrylate-b-styrene), poly(ethylene/methyl acrylate/acrylic acid)-g-poly(butyl acrylate-b-styrene), poly(ethylene/ethyl acrylate)-g-poly(butyl acrylate-b-styrene), poly(ethylene/glycidyl methacrylate)-g-poly(butyl acrylate-b-styrene), poly(ethylene/vinyl acetate/glycidyl methacrylate)-g-poly(butyl acrylate-b-styrene), (polyethylene-g-maleic anhydride)-g-poly(butyl acrylate-b-styrene), (polypropylene-g-maleic anhydride)-g-poly(butyl acrylate-b-styrene), poly[(ethylene/propylene)-g-maleic anhydride]-g-poly(butyl acrylate-b-styrene), poly[(ethylene/propylene/1,4-hexadiene)-g-maleic anhydride]-g-poly(butyl acrylate-b-styrene), poly[(ethylene/propylene/dicyclopentadiene)-g-maleic anhydride]-g-poly(butyl acrylate-b-styrene), poly[α-amino-ε-caprolactam addition product to (ethylene/propylene)-g-maleic anhydride]-g-poly(butyl acrylate-b-styrene), poly(ethylene/acrylic acid)-g-poly (butyl acrylate-b-methyl acrylate), poly(ethylene/methacrylic acid/sodium methacrylate)-g-poly(butyl acrylate-b-methyl acrylate), poly(ethylene/methacrylic acid/methacrylic acid)-g-poly(butyl acrylate-b-methyl acrylate), poly(ethylene/methacrylic acid/zinc methacrylate)-g-poly(butyl acrylate-b-methyl acrylate), poly(ethylene/methyl methacrylate/methacrylic acid/magnesium methacrylate)-g-poly(butyl acrylate-b-methyl acrylate), poly(ethylene/isobutyl acrylate/methacrylic acid/zinc methacrylate)-g-poly(butyl acrylate-b-methyl acrylate), poly(ethylene/methyl acrylate)-g-poly(butyl acrylate-b-methyl acrylate), poly(ethylene/methyl acrylate/acrylic acid)-g-poly(butyl acrylate-b-methyl acrylate), poly(ethylene/ethyl acrylate)-g-poly(butyl acrylate-b-methyl acrylate), poly(ethylene/glycidyl methacrylate)-g-poly(butyl acrylate-b-methyl acrylate), poly(ethylene/vinyl acetate/glycidyl methacrylate)-g-poly(butyl acrylate-b-methyl acrylate), poly(ethylene-g-maleic anhydride)-g-poly(butyl acrylate-b-methyl acrylate), (polypropylene-g-maleic anhydride)-g-poly(butyl acrylate-b-methyl acrylate), poly[(ethylene/propylene)-g-maleic anhydride]-g-poly(butyl acrylate-b-methyl acrylate), etc.

The graft efficiency calculated from the equation shown below, of the addition polymer in the component (c) grafted polyolefin modified product may preferably be 1% or more, more preferably be 5% or more.

$$\text{Graft efficiency (\%)} = \frac{\text{Grafted polymer}}{\text{Polymer having peroxy bond in the molecular chain used}} \times 100$$

An overly low graft efficiency may result in no compatibilizing effect between the polyamide and thermoplastic polyester, undesirably.

The component (c) grafted polyolefin modified product may have a melt index preferably of from 0.01 to 40 g/10 minutes, more preferably from 0.1 to 30 g/10 minutes. Usually, the grafting of the modified polyolefin with the addition polymer may greatly lower the melt index, but the operation and effect of this invention may not be affected at all. The product having a melt index exceeding 40 g/10 minutes makes it impossible to stably obtain the compositions capable of giving preferred physical properties when it is added in the polyamide and thermoplastic polyester.

The resin composition of this invention can be obtained by compounding component (c) in a given amount to a mixture compounded with component (a) and component (b) in given amounts.

Component (a) and component (b) are compounded in an amount of from 5 to 95% by weight for component (a) and from 95 to 5% by weight for component (b). Here the amount for compounding component (a) otherwise less than 5% by weight may result in no appearance of the superior strong points such as chemical resistance and wear resistance inherent in polyamides, and instead may result in appearance of the weak points such as hydrolytic properties of the thermoplastic polyester, undesirably. Also, the amount for compounding component (a) otherwise more than 95% by weight may result in a high water-absorption property and great dimensional change, undesirably. More preferably, component (a) and component (b) may be compounded in the proportion of from 35 to 90% by weight for component (a) and from 65 to 10% by weight for component (b). In this invention the polymide and thermoplastic polyster constituting the composition may preferably form the so-called islands-in-the sea structure (herein the sea represents the polyamide and the islands represent the thermoplastic polyster, and the island-in-the sea structure indicates the state that thermoplastic polyster particles having a smaller particle diameter are dispersed between polymide matrix), and the amount for compounding component (a) between 35 and 90% by weight is preferable for forming the above island-in-the sea structure.

The component (c) may be compounded in an amount of from 0.5 part to 40 parts by weight, preferably from 1 part to 35 parts by weight, and more preferably from 2 to 30 parts by weight, based on 100 parts by weight of the mixture of component (a) and component (b) compounded in the above proportion. Here, the amount for compounding component (c) otherwise less than 0.5 part by weight may result in a lowering of the effect of compatibilizing the component (a) and component (b) to make it impossible to uniformly disperse both the components and make larger the particle diameter of both the dispersed components, so that molded products having dense and homogenous structure can not be obtained, bringing about a lowering or scattering of their mechanical properties. Also, the amount for compounding component (c) otherwise more than 40 parts by weight makes it difficult to bring out the properties respectively possessed by component (a) and component (b).

In this invention, as previously mentioned the resin composition of this invention may preferably further contain 0.3 part to 20 parts by weight of ethylenedimelamine as component (d).

The component (d) ethylenedimelamine of this invention is a known compound, which can be obtained, for example, by the methods disclosed in Japanese Patent Publication No. 53348/1986, and Japanese Unexamined Patent Publications No. 50968/1985 and No. 186965/1984.

Component (d) may be compounded in an amount of from 0.3 part to 20 parts by weight, preferably from 0.5 part to 15 parts by weight, and more preferably from 0.5 part to 10 parts by weight, based on 100 parts by weight of the mixture of component (a), component (b) and component (c) compounded in the above proportion. Here, the amount for compounding component (d) otherwise less than 0.3 part by weight makes it impossible to obtain resin compositions having the high rigidity as aimed in this invntion. The amount otherwise more than 20 parts by weight may also result in a lowering of other mechanical properties, particularly tensile elongation and impact strength, undesirably, although the resin compositions having a high rigidity can be obtained.

In the resin composition of this invention, other components as exemplified by pigments, dyes, reinforcing materials, fillers, heat-resistant agents, antioxidants, anti-weathering agents, lubricants, nucleating agents, anti-blocking agents, release agents, plasticizers, flame retardants, antistatic agents, coupling agents, other polymers, etc. can be added and compounded so long as the moldability and physical properties thereof are not impaired. In particular, it is important to add reinforcing materials and fillers, and there can be added and compounded fibrous or powdery reinforcing materials such as glass fiber, asbestos fiber, carbon fiber, graphite fiber, wallastenite, talc, calcium carbonate, mica, clay, potassium titanate whisker, glass beads, etc.

There is no particular limitation in the method of preparing the resin composition of this invention, and there can be applied a method in which the components (a) to (c) are melt kneaded with use of a monoaxial or multiaxial extruder.

After the melt kneading of the resin composition of this invention in the above manner, molding may be carried out by the method such as injection molding, extruding, blowing or pressurizing, whereby a molded product having superior mechanical properties can be obtained. This product is formed by homogeneous dispersion of the respective constituent components, and particularly the component (b) thermoplastic polyester is present in the molded product in the form of particles having an average particle diameter of 2 µm or less, or further 1 µm or less. This indicates that the resin composition has been melt kneaded in a homogeneous state and the resulting molded products have a dense and homogeneous structure.

Such molded products are useful as component materials for various automobile parts, machine parts, electric or electronic parts and component materials for general merchandise.

EXAMPLES

This invention will be described below in greater detail by giving Examples. In the following, the evaluation of the respective properties of molded products was made in accordance with the following methods:

(1) Tensile strength: ASTM D638
(2) Tensile elongation at break: ASTM D638
(3) Flexural strength: ASTM D790
(4) Flexural modulus: ASTM D790
(5) Izod impact strength: ASTM D256
(6) Heat distortion temperature: Measured 10 times following ASTM D648, and indicated by minimum values, maximum values and average values.
(7) Diameter of dispersed particles of thermoplastic polyester: Small pieces of the respective molded products were prepared with use of a microtome, and the resulting small pieces were dyed with rhodamine B and washed with water, and thereafter the particle diameter of the thermoplastic polyester particles in said small pieces was measured using a light microscope (×1,000).

(8) Hydrolytic resistance: Dumbbell pieces molded according to ASTM D638 were immersed in 100° C. hot water for 400 hours, and thereafter the resulting dumbbell pieces were dried under reduced pressure for 7 days at 80° C. Thereafter, the tensile strength was measured according to ASTM D638, and the hydrolytic resistance was evaluated from the retension of the strength.

Examples 1 to 13 and Comparative Examples 1 to 6

Using the following respective components as components (a) to (c) of the resin composition of this invention, resin compositions were prepared in the combination and compounding amount as shown in Table 1, of the respective components to prepare test pieces as molded products and for use in the evaluation of the respective properties.

Component (a)

(a)-1: Nylon 66 (Nylon 66 available from Ube Industries, Ltd; grade name: 2020B)

(a)-2: Nylon 6 (Nylon 6 available from Ube Industries, Ltd; grade name: 1013B)

(a)-3: Nylon 12 (Nylon 12 available from Ube Industries, Ltd; grade name: 3035U)

Component (b)

(b)-1: Polyethylene terephthalate (polyethylene terephthalate available from Mitsui Pet Co.; grade name: J125)

(b)-2: Polybutylene terephthalate (polybutylene terephthalate available from Teijin Limited; grade name: C7000)

Component (c)

(c)-1: A grafted polyolefin modified product comprising poly(ethylene/glycidyl methacrylate)-g-poly(butyl acrylate-b-methyl acrylate) obtained by melt kneading 70 parts by weight of a poly(ethylene/glycidyl methacrylate) copolymer (ethylene/glycidyl methacrylate=85/15) and 30 parts by weight of poly(butyl acrylate-b-methyl acrylate) (butyl acrylate/methyl acrylate=10/90) having a peroxy bond in the side chain, with use of a melt extruder at a melting temperature of 200°±20° C. (available from Nippon Oil & Fats Co., Ltd.; grade name: Modiper A4200)

(c)-2: A grafted polyolefin modified product comprising poly(ethylene/glycidyl methacrylate)-g-poly(butyl acrylate-b-styrene) obtained by melt kneading 70 parts by weight of a poly(ethylene/glycidyl methacrylate) copolymer (ethylene/glycidyl methacrylate=85/15) and 30 parts by weight of poly(butyl acrylate-b-styrene) (butyl acrylate/styrene=10/90) having a peroxy bond in the side chain, with use of a melt extruder at a melting temperature of 200°±20° C. (available from Nippon Oil & Fats Co., Ltd.; grade name: Modiper A4100)

Molded products were prepared in the following manner. First, the respective components in the amounts as shown in Table 1 were preliminarily mixed, followed by melt kneading at 280° C. with use of an extruder having a screw diameter of 30 mm to make pellets. Thereafter, the pellets were dried in vacuo at 110° C., and injection molding was carried out by means of an injection molding machine under the conditions of cylinder temperature of 280° C. and mold temperature of 80° C. to obtain molded products. The resulting molded products were used as test pieces for evaluating the respective properties to carry out evaluation tests. Results obtained are shown in Table 1.

TABLE 1

| | | Examples | | | | | | |
|---|---|---|---|---|---|---|---|---|
| | | 1 | 2 | 3 | 4 | 5 | 6 | 7 |
| Component (a) (pbw) | (a)-1 | 70 | 70 | 70 | 50 | 70 | 70 | 70 |
| | (a)-2 | — | — | — | — | — | — | — |
| | (a)-3 | — | — | — | — | — | — | — |
| Component (b) (pbw) | (b)-1 | 30 | 30 | 30 | 50 | 30 | 30 | 30 |
| | (b)-2 | — | — | — | — | — | — | — |
| Component (c) (pbw) | (c)-1 | 2 | 4 | 10 | 25 | — | — | — |
| | (c)-2 | — | — | — | — | 2 | 4 | 10 |
| Tensile strength (kg/cm$^2$) | | 730 | 710 | 600 | 480 | 730 | 700 | 600 |
| Tensile elongation at break (%) | | 120 | 150 | 60 | 50 | 140 | 110 | 100 |
| Flexural strength (kg/cm$^2$) | | 1100 | 1030 | 860 | 710 | 1080 | 1050 | 850 |
| Flexural modulus (kg/cm$^2$) | | 27500 | 25800 | 23100 | 20000 | 28000 | 27000 | 22000 |
| Izod impact strength (kg·cm/cm) | | 4.5 | 4.5 | 6 | 7.5 | 4.5 | 4.0 | 5.5 |
| Heat distortion temperature (°C.) | Minimum | 210 | 200 | 175 | 140 | 190 | 190 | 195 |
| | Average | 225 | 210 | 185 | 141 | 200 | 200 | 197 |
| | Maximum | 230 | 215 | 195 | 145 | 210 | 210 | 200 |
| Average particle diameter (μm) of thermoplastic polyester | | 1-2 | 1 | <1 | <1 | <1 | 1-2 | 1 |

| | Examples | | | | |
|---|---|---|---|---|---|
| 8 | 9 | 10 | 11 | 12 | 13 |

TABLE 1-continued

|  |  | | | | | | |
|---|---|---|---|---|---|---|---|
| Component<br>(a)<br>(pbw) | (a)-1<br>(a)-2<br>(a)-3 | 50<br>—<br>— | 70<br>—<br>— | 50<br>—<br>— | —<br>70<br>— | —<br>70<br>— | —<br>—<br>70 |
| Component<br>(b)<br>(pbw) | (b)-1<br>(b)-2 | 50<br>— | —<br>30 | —<br>50 | 30<br>— | —<br>30 | 30<br>— |
| Component<br>(c)<br>(pbw) | (c)-1<br>(c)-2 | —<br>25 | 10<br>— | —<br>10 | 10<br>— | 10<br>— | 10<br>— |
| Tensile strength (kg/cm²) | | 470 | 580 | 580 | 540 | 610 | 480 |
| Tensile elongation at break (%) | | 180 | 120 | 110 | >200 | >200 | |
| Flexural strength (kg/cm²) | | 670 | 850 | 830 | 800 | 850 | 750 |
| Flexural modulus (kg/cm²) | | 18600 | 25500 | 24500 | 21200 | 23600 | 21000 |
| Izod impact strength (kg·cm/cm) | | 7.0 | 6 | 5.5 | 7 | 8 | 10 |
| Heat distortion temperature (°C.) | Minimum<br>Average<br>Maximum | 144<br>145<br>146 | 180<br>185<br>190 | 192<br>195<br>200 | 173<br>178<br>180 | 170<br>172<br>177 | 135<br>141<br>144 |
| Average particle diameter (μm) of thermoplastic polyester | | <1 | <1 | <1 | <1 | <1 | <1 |

|  |  | Comparative Examples | | | | | |
|---|---|---|---|---|---|---|---|
|  |  | 1 | 2 | 3 | 4 | 5 | 6 |
| Component<br>(a)<br>(pbw) | (a)-1<br>(a)-2<br>(a)-3 | 70<br>—<br>— | 50<br>—<br>— | 70<br>—<br>— | —<br>70<br>— | —<br>70<br>— | —<br>—<br>70 |
| Component<br>(b)<br>(pbw) | (b)-1<br>(b)-2 | 30<br>— | 50<br>— | —<br>30 | 30<br>— | —<br>30 | 30<br>— |
| Component<br>(c)<br>(pbw) | (c)-1<br>(c)-2 | —<br>— | —<br>— | —<br>— | —<br>— | —<br>— | —<br>— |
| Tensile strength (kg/cm²) | | 765 | 730 | 650 | 620 | 650 | 450 |
| Tensile elongation at break (%) | | 25 | 10 | 21 | 25 | 30 | 25 |
| Flexural strength (kg/cm²) | | 1100 | 1000 | 950 | 750 | — | — |
| Flexural modulus (kg/cm²) | | 29600 | 29500 | 26500 | 23500 | — | — |
| Izod impact strength (kg·cm/cm) | | 3.5 | 2 | 3 | 2.5 | 5 | 5 |
| Heat distortion temperature (°C.) | Minimum<br>Average<br>Maximum | 165<br>200<br>236 | 155<br>180<br>220 | 165<br>180<br>221 | 141<br>165<br>181 | 131<br>163<br>185 | 100<br>121<br>145 |
| Average particle diameter (μm) of thermoplastic polyester | | 3-5 | 5< | 3-5 | 3-5 | 3-5 | 3-5 |

As will be clear from Table 1, the respective molded products of Examples show superior values in respect of all of the tensile strength, tensile elongation at break, flexural strength, flexural modulus and izod impact strength, have a high heat distortion temperature, and also show a small scattering of these, where, in particular, the smaller the amounts for compounding component (c) is within the range of the prescribed compounding amount, the better results are obtained in respect of these respective properties. Also, the thermoplastic polyester dispersed in the molded products has an average particle diameter of 2 μm or less in all examples, or 1 μm or less in most examples. This indicates that the respective components have been melt kneaded in a homogeneous state, and further that the molded products have a dense and homogeneous structure.

On the other hand, the respective molded products of Comparative Examples showed superior values in respect of the tensile strength, flexural strength and flexural modulus, but low values in respect of the tensile elongation at break and izod impact strength. Also, in respect of the heat distortion temperature, some examples showed high values, but in any examples there was seen a very great scattering. The thermoplastic polyester dispersed in the molded products had an average particle diameter of 3 μm or more in all examples. This indicates that in the case when the polyamide and polyester are melt kneaded, both the component were not so homogeneously kneaded as compared with the instances of Examples.

Examples 14 to 18 and Comparative Examples 7 to 10

Using the following respective components as components (a) to (c) of the resin composition of this invention, resin compositions were prepared in the combination and compounding amount as shown in Table 2, of the respective components to prepare test pieces as molded products and for use in the evaluation of the respective properties.

Component (a)

Used were nylon 6 (PA-6: trade name, available from Ube Industries, Ltd.) and nylon 66 (PA-66: trade name, available from Ube Industries, Ltd.) having the concentration ratio of terminal amino groups to terminal carboxyl group ($[NH_2]/[COOH]$) as shown in Table 2.

Component (b)

Polyethylene terephthalate (PET) (polyethylene terephthalate available from Mitsui Pet Co.; grade name: J125)

Component (c)

(c)-1: A grafted polyolefin modified product comprising poly(ethylene/glycidyl methacrylate)-g-poly(butyl acrylate-b-methyl acrylate) obtained by melt kneading 70 parts by weight of a poly(ethylene/glycidyl methacrylate) copolymer (ethylene/glycidyl methacrylate=85/15) and 30 parts by weight of poly(butyl acrylate-b-methyl acrylate) (butyl acrylate/methyl acrylate=10/90) having a peroxy bond in the side chain, with use of a melt extruder at a melting temperature of 200°±20° C. (available from Nippon Oil & Fats Co., Ltd.; grade name: Modiper A4200)

(c)-2: A grafted polyolefin modified product comprising poly(ethylene/glycidyl methacrylate)-g-poly(butyl acrylate-b-styrene) obtained by melt kneading 70 parts by weight of a poly(ethylene/glycidyl methacrylate) copolymer (ethylene/glycidyl methacrylate=85/15) and 30 parts by weight of poly(butyl acrylate-b-styrene) (butyl acrylate/styrene=10/90) having a peroxy bond in the side chain, with use of a melt extruder at a melting temperature of 200°±20° C. (available from Nippon Oil & Fats Co., Ltd.; grade name: Modiper A4100)

Molded products were prepared in the following manner. First, the respective components in the amounts as shown in Table 2 were preliminarily mixed, followed by melt kneading at 270° to 280° C. with use of an extruder havng a screw diameter of 30 mm to make pellets. Thereafter, the pellets were dried in vacuo, and injection molding was carried out by means of an injection molding machine under the conditions of cylinder temperature of 270° to 280° C. and mold temperature of 80° C. to obtain molded products. The resulting molded products were used as test pieces for evaluating the respective properties to carry out evalutation tests. Results obtained are shown in Table 3.

TABLE 2

| | Component (a) | | | Component (b) | | | Component (c) | |
|---|---|---|---|---|---|---|---|---|
| | Type | Relative viscosity ($\eta r$) | $[NH_2]/[COOH]$ | Compounding amount (pbw) | Type | Relative viscosity ($\eta r$) | Compounding amount (pbw) | Type | Compounding amount (pbw) |
| Example 14 | PA-6 | 2.5 | 3.3 | 70 | PET | 0.79 | 30 | (C)-1 | 4 |
| Example 15 | PA-6 | 2.5 | 3.3 | 70 | PET | 0.79 | 30 | (C)-1 | 10 |
| Example 16 | PA-6 | 2.5 | 3.3 | 70 | PET | 1.0 | 30 | (C)-2 | 4 |
| Example 17 | PA-6 | 2.5 | 3.3 | 50 | PET | 0.79 | 50 | (C)-2 | 10 |
| Example 18 | PA-66 | 3.1 | 2.5 | 70 | PET | 0.79 | 30 | (C)-2 | 10 |
| Comparative Example 7 | PA-6 | 2.5 | 0.4 | 70 | PET | 0.79 | 30 | (C)-1 | 4 |
| Comparative Example 8 | PA-6 | 2.5 | 0.4 | 70 | PET | 0.79 | 30 | (C)-1 | 10 |
| Comparative Example 9 | PA-6 | 2.5 | 0.7 | 70 | PET | 0.79 | 30 | (C)-2 | 4 |
| Comparative Example 10 | PA-66 | 2.8 | 0.8 | 70 | PET | 0.79 | 30 | (C)-2 | 10 |

TABLE 3

| | Tensile strength (kg/cm$^2$) | Elongation (%) | Flexural modulus (kg/cm$^2$) | Notched impact strength (kg·cm/cm) | High distortion temperature (°C.) | Retension of tensile strength (%) |
|---|---|---|---|---|---|---|
| Example 14 | 610 | 192 | 20,900 | 9.0 | 163 | 100 |
| Example 15 | 530 | 174 | 18,200 | 11.0 | 154 | 99 |
| Example 16 | 610 | 200< | 20,500 | 10.0 | 162 | 100 |
| Example 17 | 500 | 200< | 17,400 | 14.5 | 150 | 97 |
| Example 18 | 600 | 200< | 22,000 | 8.0 | 195 | 100 |
| Comparative Example 7 | 560 | 22 | 20,900 | 3.4 | 168 | 31 |
| Comparative Example 8 | 510 | 7 | 18,100 | 4.0 | 171 | 28 |
| Comparative Example 9 | 570 | 185 | 21,700 | 4.9 | 167 | 80 |
| Comparative Example 10 | 600 | 100 | 22,100 | 5.3 | 197 | 80 |

As will be clear from Table 3, the respective molded products of Examples show superior values in respect of all of the tensile strength, elongation, flexural modulus and notched impact strength. Moreover, the molded products of Examples are found to have superior hydrolytic resistance as there is seen no lowering of the tensile strength after the hydrolytic resistance tests.

On the other hand, the respective molded products of Comparative Examples showed superior values in respect of the tensile strength and flexural modulus, but low values in respect of the elongation and notched impact strength, particularly showing an extreme lowering of the tensile strength after the hydrolytic resistance tests.

Examples 19 to 23 and Comparative Examples 11 to 14

Using the following respective components as components (a) to (d) of the resin composition of this invention, resin compositions were prepared in the combination and compounding amount as shown in Table 4, of the respective components to prepare test pieces as molded products and for use in the evaluation of the respective properties.

Component (a)

(a)-1: Nylon 66 (Nylon 66 available from Ube Industries, Ltd; grade name: 2015B)

(a)-2: Nylon 6 (Nylon 6 available from Ube Industries, Ltd; grade name: 1013B)

Component (b)

(b)-1: Polyethylene terephthalate (polyethylene terephthalate available from Kuraray Co., Ltd.; grade name: KS700YT)

(b)-2: Polybutylene terephthalate (polybutylene terephthalate available from Teijin Limited; grade name: C7000)

Component (c)

A grafted polyolefin modified product comprising poly(ethylene/glycidyl methacrylate)-g-poly(butyl acrylate-b-styrene) obtained by melt kneading 70 parts by weight of a poly(ethylene/glycidyl methacrylate) copolymer (ethylene/glycidyl methacrylate=85/15) and 30 parts by weight of poly(butyl acrylate-b-styrene) (butyl acrylate/styrene=10/90) having a peroxy bond in the side chain, with use of a melt extruder at a melting temperature of 200°±20° C. (available from Nippon Oil & Fats Co., Ltd.; grade name: Modiper A4100)

Component (d)

Ethylenedimelamine (available from Nitto Riken KK)

Molded products were prepared in the following manner. First, the respective components in the amounts as shown in Table were preliminarily mixed, followed by melt kneading at a resin temperature of 275° C. with use of a biaxial extruder having a screw diameter of 30 mm to make pellets. Thereafter, the pellets were dried in vacuo, and injection molding was carried out by means of an injection molding machine under the conditions of cylinder temperature of 280° C. and mold temperature of 80° C. to obtain molded products. The resulting molded products were used as test pieces for evaluating the respective properties to carry out evaluation tests. Results obtained are shown in Table 4.

TABLE 4

|  |  | Example | | | | | Comparative Example | | | |
| --- | --- | --- | --- | --- | --- | --- | --- | --- | --- | --- |
|  |  | 19 | 20 | 21 | 22 | 23 | 11 | 12 | 13 | 14 |
| Component (a) (pbw) | (a)-1 | 70 | 70 | 50 | — | 70 | 70 | — | 50 | 70 |
|  | (a)-2 | — | — | — | 70 | — | — | 70 | — | — |
| Component (b) (pbw) | (b)-1 | 30 | 30 | 50 | 30 | — | 30 | 30 | 50 | — |
|  | (b)-2 | — | — | — | — | 30 | — | — | — | 30 |
| Component (c) (pbw) |  | 4 | 4 | 4 | 4 | 4 | 4 | 4 | 4 | 4 |
| Component (d) (pbw) |  | 3 | 5 | 3 | 3 | 3 | — | — | — | — |
| Tensile strength (kg/cm$^2$) |  | 870 | 880 | 800 | 750 | 860 | 730 | 570 | 680 | 710 |
| Tensile elongation of break (%) |  | 13 | 10 | 15 | 25 | 15 | 20 | 180 | 25 | 20 |
| Flexural strength (kg/cm$^2$) |  | 1,180 | 1,200 | 1,200 | 950 | 1,160 | 1,020 | 830 | 1,030 | 1,050 |
| Flexural modulus (kg/cm$^2$) |  | 35,900 | 37,000 | 36,500 | 31,000 | 33,500 | 26,400 | 21,700 | 27,500 | 27,000 |

As will be clear from Table 4, the molded products of Examples show superior values in respect of all of the tensile strength, flexural strength and flexural modulus, and particularly a great improvement is seen in respect of the flexural modulus.

On the other hand, the respective molded products of Comparative Examples showed low values in respect of all of the tensile strength, flexural strength and flexural modulus as compared with those according to this invention.

As described above, the composition of this invention, as having the grafted polyolefin modified product as a constituent component, makes it possible to mix and disperse the polyamide and thermoplastic polyester having no compatibility by nature, in a homogeneous state and in the form of finely divided particles.

Also, the molded product of this invention, as having a dense and homogeneous structure, has very superior mechanical properties, hydrolytic resistance and rigidity, and has the heat distortion temperature that is high and of small scattering, and moreover it may not occur that layer separation is caused in the molded product.

We claim:

1. A resin composition comprising:
   100 parts by weight of a mixture comprising (a) from 5 to 95% by weight of polyamide and (b) from 95 to 5% by weight of a thermoplastic polyester; and
   (c) from 0.5 part to 40 parts by weight of a grafted polyolefin modified product formed by graft polymerization of an addition polymer having a peroxy bond in its molecular chain to a modified polyolefin having a functional group in its molecular chain;
   said modified polyolefin is a polymer formed by introducing a monomer having at least one kind of functional group selected from the group consisting of a carboxylic acid group, a carboxylic acid metal salt group, a carboxylic acid exter group, an acid anhydride group, an epoxy group, an acid amide group and an imide group, represented by Formula (I) to (VI) shown below, into a polyolefin obtained using as main monomer components, ethylene and an alpha-olefin or diene having 3 to 20 carbon atoms, and wherein Formula (I) to (VI) are

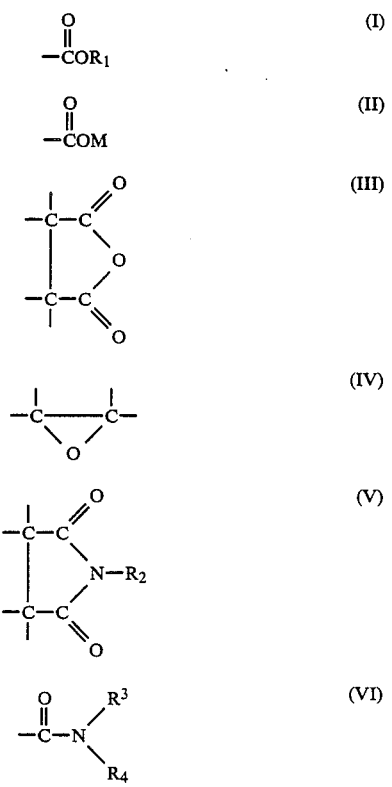

wherein $R_1$ to $R_4$ each represent a hydrogen atom or an aliphatic, alicyclic or aromatic residual group having 1 to 30 carbon atoms and M represents a mono- to trivalent metal.

2. The resin composition of claim 1, wherein the concentration ratio of terminal amino groups to terminal carboxyl groups in said polyamide is 1.5 or more.

3. The resin composition of claim 1, wherein the polyamide is at least one of polycaproamide, polyhexamethylene adipamide, polyhexamethylene sebacamide, polyundecamethylene adipamide, polyhexamethylene dodecamide, polyundecanamide, polydodecanamide, and a copolymerized polyamide or a mixture thereof.

4. The resin composition of claim 1, wherein the polyamide has a relative viscosity ranging from 2.0 to 5.0 at 25° C. in a solution obtained by dissolving it in concentrated sulfuric acid so as to be in concentration of 1%.

5. The resin composition of claim 1, wherein the thermoplastic polyester is at least one of polyethylene terephthalate, polyethylene naphthalate, polypropylene terephthalate, polybutylene terephthalate, polyhexamethylene terephthalate, polycyclohexanedimethylene terephthalate, a poly(ethylene terephthalate/ethylene isophthalate) copolymer and a poly(butylene terephthalate/butylene dodecadioate)copolymer.

6. The resin composition according to claim 1, wherein the thermoplastic polyester has a relative viscosity ranging from 1.15 to 2.5 at 25° C. in a solution obtained by dissolving it in orthochlorophenol so as to be in concentration of 0.5%.

7. The resin composition according to claim 1, wherein the functional-group-containing monomer introduced into the polyolefin is used in the amount such that the constituent units based on said monomer is contained in the modified polyolefin in an amount of from 0.001 to 70% by weight.

8. The resin composition according to claim 1, wherein the peroxy bond in the addition polymer is contained in an amount of from 0.5 to 30% by weight as constituent units.

9. The resin composition according to claim 1, wherein the addition polymer is used in the proportion of from 1 to 50% by weight relative to from 50 to 99% by weight of the modified polyolefin.

10. The resin composition according to claim 1, wherein the graft efficiency calculated from the equation shown below, of the addition polymer in the component (c) grafted polyolefin modified product is 1% or more;

$$\text{Graft efficiency (\%)} = \frac{\text{Grafted polymer}}{\text{Polymer having peroxy bond in the molecular chain used}} \times 100.$$

11. The resin composition according to claim 1, wherein the component (a) and component (b) are compounded in the proportion of from 35 to 90% by weight for component (a) and from 65 to 10% by weight for component (b).

12. The resin composition according to claim 1, wherein the component (c) is compounded in an amount of from 1 part by weight to 35 parts by weight based on 100 parts by weight of the mixture of component (a) and component (b).

13. The resin composition of claim 1 wherein said functional-group-containing monomer is selected from the group consisting of acrylic acid, methylacrylic acid, maleic acid fumaric acid, itaconic acid, crotonic acid, methylmaleic acid, methylfumaric acid, mesaconic acid, citraconic acid, glutaconic acid, methyl hydrogen maleate, methyl hydrogen itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, sodium methacrylate, potassium methacrylate, magnesium methacrylate, zinc methacrylate, sodium acrylate, magnesium acrylate, zinc acrylate, maleic anhydride,itaconic anhydride, citraconic anhydride, endobicyclo-[2,2,1]-5-heptene-2,3-dicarboxylic acid, endobicyclo-[2,2,1]-5-heptene-2,3-dicarboxylic anhydride,glycidyl acrylate, glyciyl methacrylate, acrylglyciyl ether, vinylglyciyl ether, vinyl acetate and acrylamide; and N-substituted compounds obtained by addition of ammonia, methylamine, ethylamine, butylamine, hexylamine, dodecylamine, oleylamine, stearyamine, cyclohexylamine, benzylamine, aniline, naphthylamine, dimethylamine, diethylamine, methylethylamine, dibutylamine, distearylamine, dicyclohexylamine, ethylcyclohexylamine, methylaniline, phenylnaphthylamine, melamine, ethhanolamine, 3-amino-1-propanol, diethanolamine, morpholine, α-amino-1-pyrrolidone, α-amino-ϵ-caprolactam, α-monomethylamino-ϵ-caprolactam, α-monoethylamino-ϵ-caprolactam, α-monobenzylamino-ϵ-caprolactam or an amino group terminated nylon 6 oligomer, to said herein described α,β-unsaturated carboxylic acids.

14. The resin composition of claim 13 wherein said alphaolefin or diene is selected from the group consisting of propylene, butene-1, pentene-1, 4-methylpentene-1, isobutylene, 1,4-hexadiene, dicyclopentadiene, 2,5-norbornadiene, 5-ethyl-2,5-norbornadiene, 5-ethylidenenorbornene, 5-(1'-propenyl)-2-norbornene, butadiene and isoprene.

15. The resin composition of claim 1 wherein said alpha-olefin or diene is selected from the group consisting of propylene, butene-1, pentene-1, 4-methylpentene-1, isobutylene, 1,4-hexadiene, dicyclopentadiene, 2,5-norbornadiene, 5-ethyl-2,5-norbornadiene, 5-ethylidenenorbornene, 5-(1'-propenyl)-2-norbornene, butadiene and isoprene.

16. A molded product comprising a resin composition comprising:
100 parts by weight of a mixture comprising (a) from 5 to 95% by weight of polyamide and (b) from 95 to 5% by weight of a thermoplastic polyester; and
(c) from 0.5 part to 40 parts by weight of a grafted polyolefin modified product formed by graft polymerization of an addition polymer having a peroxy bond in its molecular chain to a modified polyolefin having a functional group in its molecular chain;
said thermoplastic polyester is a particle having an average particle diameter of 2 $\mu$m or less being dispersed in said molded product.

* * * * *